Feb. 16, 1965 W. MESSERSCHMITT ETAL 3,169,728
INTAKE FOR JET PROPULSION UNITS, MORE
PARTICULARLY FOR AIRCRAFT
Filed Nov. 29, 1962 2 Sheets-Sheet 2

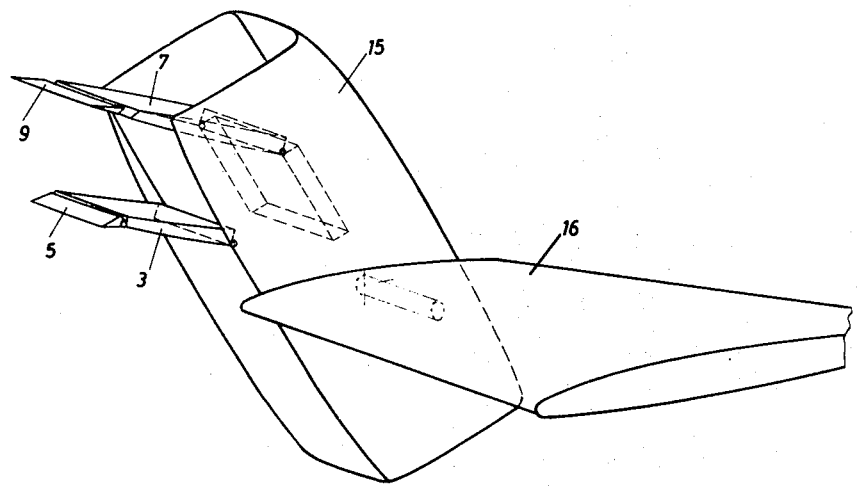
*Fig. I.*
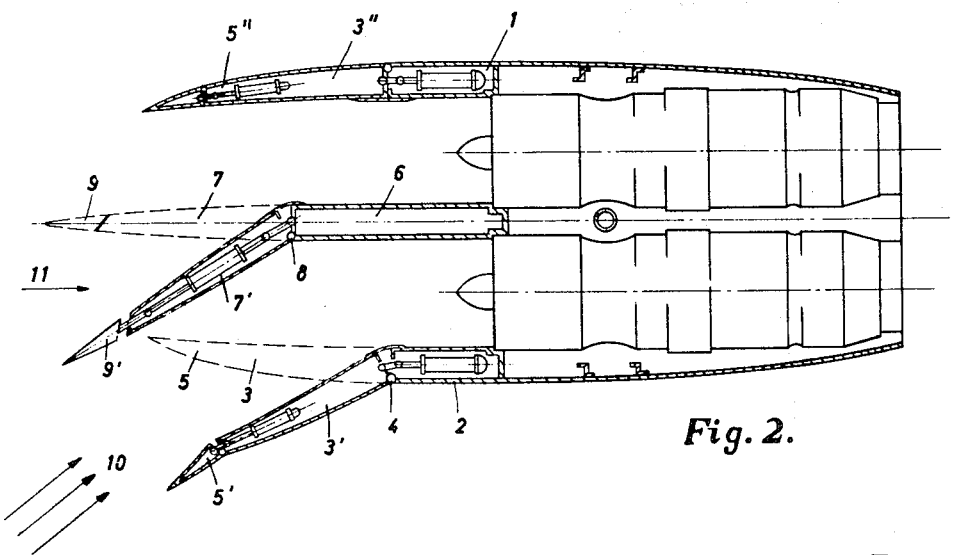
*Fig. 2.*
WILLY MESSERSCHMITT
HELMUT LANGFELDER
INVENTORS
Hall, Pollock + Vande Sande
ATTORNEYS.

WILLY MESSERSCHMITT
HELMUT LANGFELDER
INVENTORS

Hall, Pollock + Vonde Sande
ATTORNEYS.

United States Patent Office 3,169,728
Patented Feb. 16, 1965

3,169,728
INTAKE FOR JET PROPULSION UNITS, MORE PARTICULARLY FOR AIRCRAFT
Willy Messerschmitt and Helmut Langfelder, Munich, Germany, assignors to Messerschmitt AG., Augsburg, Germany, a company of Germany
Filed Nov. 29, 1962, Ser. No. 241,076
Claims priority, application Germany, Oct. 20, 1959, M 43,115
20 Claims. (Cl. 244—23)

This invention relates to an intake for jet propulsion units, more particularly for aircraft.

The present application comprises a continuation-in-part of our copending application Serial No. 63,542, filed October 19, 1960, now abandoned, for "Intake for Jet Propulsion Units More Particularly for Aircraft."

In freely-mounted jet propulsion units in aircraft, which must be rotated through an angle of about 90° for vertical take-off, it is important that the intake should function satisfactorily in normal flight at sub- and supersonic speeds as well as when the angle of incidence of the air-stream is oblique such as during the transition from vertical take-off to normal flight and vice versa. When use is made of a conventional wedge-mouth intake, the invention proposes to adapt the orientation of the intake to such conditions by changing its position and shape in relation to the horizontal by means of auxiliary flaps.

The invention is illustrated by way of example in the accompanying drawing wherein:

FIGURE 1 shows the intake with the power plant nacelle in a tilted position, and FIGURE 2 is a sectional side elevation of the intake with parts thereof in a modified position, showing control means for flaps and tabs.

Figure 3:
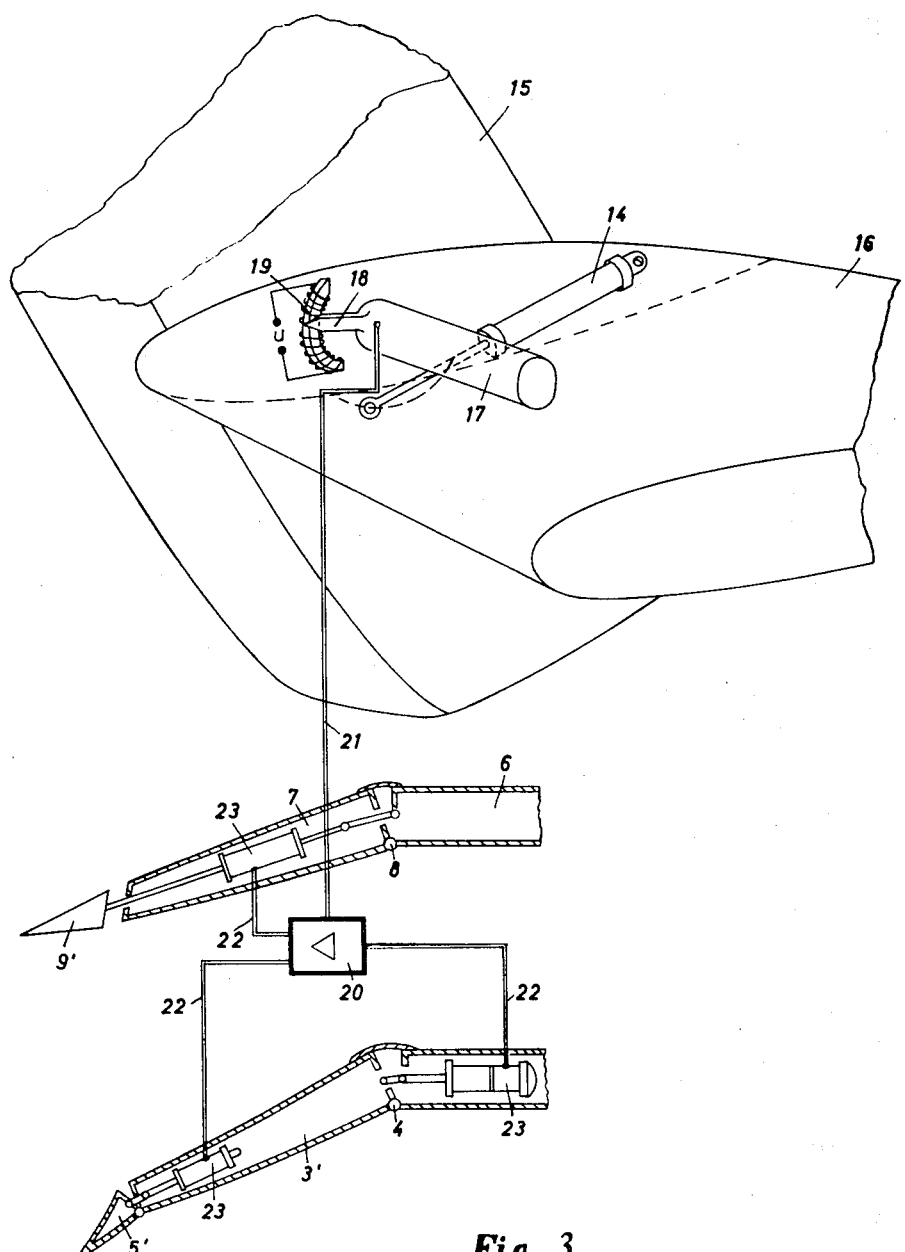
FIGURE 3 shows the cylinders and control means employed for the tilting of the flaps.

The jet power nacelle 15 with the intake may be mounted on an air foil 16, as shown in FIGURE 1.

As shown in FIGURE 2, the intake of the jet propulsion unit is constituted by walls 1, 2 which are shaped in conventional manner so that the mouth of the intake is wedge-shaped.

According to the present invention, the bottom wall 2 is provided with an auxiliary flap 3 pivoted to swing on a fulcrum or axis 4 and shaped so as to merge into the remainder of the intake duct. The leading edge of the auxiliary flap 3 carries a tab 5 which, in conventional manner, is likewise deflectable.

Moreover, according to the invention, the forward end of a central member 6 of the power unit likewise carries an auxiliary flap 7 which is arranged to pivot on a fulcrum or axis 8, and which on its leading end likewise carries a tab 9 which may be extended in conventional manner thereby to open a slot.

Also, FIGURE 2 shows how the intake can be adapted to an oblique angle of incidence of the air stream, indicated by arrows 10.

According to the obliquity of the air stream, the auxiliary flaps and tabs can be deflected into the positions 3', 5', 7', 9' shown in FIGURE 2 and any intermediate positions between those shown in FIGURE 2 and FIGURE 1 are naturally possible.

In order to adapt the deflecting elements 3, 7, 5, 9 of the intake to the angle of incidence 10, 11 of the airstream, said elements are coupled to the means for effecting the rotary or tilting motion of the entire power unit in relation to the aircraft, so that said elements 3, 7, 5, 9 will assume the correct positions associated with the transient angle of tilt or rotation of the power unit, thus ensuring a clean entry of air into the intake.

The coupling means may be kinematic or alternatively they may be of a hydraulic or electrical nature for ensuring that at any possible angle of incidence of the air stream the said elements will always assume positions, for instance 3', 5', 7', 9', at which the air will enter cleanly into the intake.

FIGURE 3 includes a more detailed showing of the cylinders and control means employed for the tilting of the flaps. The use of such hydraulic cylinders corresponds essentially to cylinder structures now widely employed for the tilting of flaps in various types of modern aircraft. The showing in FIGURE 3 illustrates that the power plant nacelle 15 may be tilted by means of a hydraulic tilt cylinder 14 about a shaft 17 relative to the air foil 16. During such tilting, the tilt position of the nacelle 15 may be monitored by an arrangement comprising a potentiometer 19 associated with a selector 18 producing a signal proportional to the angle of incidence, which signal may be coupled via leads 21 to a control unit 20. The output of unit 20, appearing across leads 22, may thereafter control the adjustment of hydraulic servomotors 23, all in conventional manner.

If considered desirable, wall 1 may likewise be fitted with elements corresponding to the elements 3, 5.

We claim:

1. In combination, a jet propulsion power unit mounted at the wing tip of an aircraft for propelling said aircraft in cruising flight, said mounting means including means whereby said power unit is capable of being tilted into position for a vertical takeoff, said power unit including a unitary air intake having a wedge-shaped mouth, a pair of flaps pivotally mounted adjacent said mouth for defining a continuous uninterrupted air flow passage to said power unit, one of said flaps being disposed adjacent a central portion of said intake and the other of said flaps being disposed adjacent a wall of said intake, and means responsive to variations in the tilt position of said propulsion unit relative to said aircraft wing tip for simultaneously varying the positions of both said flaps about their respective pivotal mountings, whereby the shape and orientation of at least portions of said uninterrupted air flow passage are changed with changes in the angle of incidence of the air-stream entering said unit.

2. An intake for a jet propulsion power unit which is freely mounted at an aircraft wing tip and is capable of being tilted or deflected relative to said wing tip from a substantially horizontal cruise position into a position for a vertical takeoff, comprising an inlet having a wedge-shaped mouth and a substantially horizontal wedge portion located and forming an uninterrupted boundary surface at a central position within said wedge-shaped mouth, a tiltable first auxiliary flap on a wall of said intake, a tiltable second auxiliary flap on said wedge portion, said first and second flaps defining an uninterrupted air flow passage therebetween the size ond orientation of which is dependent upon the positions of said first and second auxiliary flaps relative to one another, and means for simultaneously tilting both said first and second auxiliary flaps in like directions relative to the central axis of said unit with changes in the tilt position of said unit relative to said aircraft.

3. In a jet propulsion unit, means for mounting said unit outboard of an aircraft wing tip, said mounting means including means for tilting said unit about said wing top relative to said aircraft wing into position for vertical takeoff, said unit comprising an intake having a wedge-shaped mouth, a deflectable first auxiliary flap on a wall of said mouth, a tiltable tab on the leading edge of said wall for selectively varying the size of said mouth, a deflectable second auxiliary flap on a forward central portion of said unit, said first and second flaps defining an uninterrupted air passage therebetween through said mouth to said propulsion unit, an extensible slot-forming tab on said second flap, and means for simultaneously varying the positions of both said flaps and both said tabs thereby to vary the size and orientation of said intake.

4. An intake for a jet propulsion unit which is mounted on an aircraft wing tip for movement from a cruising position into a position for vertical takeoff of said aircraft, an air inlet in said unit having wedge portions and a wedge-shaped mouth, and means for varying the effective shape and orientation of said inlet comprising at least two deflectable auxiliary flaps forming continuous boundary surfaces adjacent the walls of said mouth and merging with said jet propulsion unit, tabs on the leading edges of said boundary surfaces, said tabs being mounted for movement relative to said flaps to change the shape of said mouth, a further deflectable auxiliary flap on a forward central portion of said unit, and a slot-forming tab on said further flap.

5. In a thin-winged vertical takeoff aircraft adapted for supersonic flight, a jet propulsion unit mounted at a wing tip of said aircraft, said mounting means including means for tilting the position of said unit relative to said aircraft wing, an air intake in said unit, a flap tiltably mounted in a central portion of said intake, said flap forming a continuous boundary surface extending from said jet propulsion unit through the central portion of said intake and terminating in an extensible tab adapted to selectively form a slot between said tab and said flap, and means for simultaneously tilting said flap and extending said slot-forming tab with variations in the tilt position of said unit relative to said aircraft wing tip.

6. In an aircraft of the type employing a jet propulsion power unit adapted to be variably tilted between cruise and takeoff positions, said unit having an air intake, the improvement which comprises means for changing the effective shape and orientation of said air intake with changes in the position of said unit relative to said aircraft, said last-named means including at least one flap tiltably mounted adjacent a portion of said intake and terminating in an extensible slot-forming tab.

7. The structure of claim 6 wherein said flap is mounted and defines a first uninterrupted boundary surface adjacent a central portion of said intake, and at least one further tiltable flap disposed and forming a second uninterrupted boundary surface adjacent a side wall of said intake for tiltable movement with tilting in the position of said first-mentioned flap, thereby to change the orientation of the air passage between said first and second uninterrupted boundary surfaces.

8. The combination of claim 7 wherein said further flap in the side wall of said intake terminates in a tab tiltable relative to the remainder of said further flap for selectively changing the shape of said intake.

9. The combination of claim 6 wherein said flap defines an uninterrupted boundary surface merging with said power unit and disposed adjacent a central portion of said intake, and at least two further flaps mounted in spaced relation to one another in the side walls of said intake for tiltable movement with tilting of said first-mentioned flap thereby to change the orientation of said air intake.

10. The combination of claim 9 wherein each of said two further flaps terminates in a tab tiltable with respect to the remainder of its associated flap for selectively changing the shape of said air intake.

11. An intake for a jet propulsion unit which is freely mounted on an aircraft and capable of being tilted or deflected into position for a vertical takeoff, said intake having a wedge-shaped mouth, a pair of flaps pivotally mounted adjacent said mouth, one of said flaps being disposed adjacent a central portion of said intake and the other of said flaps being disposed adjacent a wall of said intake, and means responsive to variations in the tilt position of said propulsion unit relative to said aircraft for simultaneously varying the positions of both said flaps about their respective pivotal mountings, whereby the shape and orientation of said intake is changed corresponding to changes in the angle of incidence of the air-stream entering said unit.

12. An intake for a jet propulsion unit which is freely mounted on an aircraft and is capable of being tilted or deflected from a substantially horizontal position into a position for a vertical takeoff, comprising an inlet having a substantially horizontal wedge portion and a wedge-shaped mouth, a tiltable first auxiliary flap on a wall of said intake, a tiltable second auxiliary flap on a forward central member of said unit, and means for simultaneously tilting both said first and second auxiliary flaps in like directions relative to the central axis of said unit with changes in the tilt position of said unit relative to said aircraft.

13. In a jet propulsion unit, means for mounting said unit on an aircraft, said mounting means including means for tilting said unit relative to said aircraft into a position for vertical takeoff, said unit comprising an intake having a wedge-shaped mouth, a deflectable first auxiliary flap on a wall of said mouth, a tiltable tab on the leading edge of said wall, a deflectable second auxiliary flap on a forward central portion of said unit, an extensible slot-forming tab on said second flap, and means for simultaneously varying the positions of both said flaps and both said tabs thereby to vary the shape and orientation of said intake.

14. An intake for a jet propulsion unit which is mounted on an aircraft for movement from a cruising position into a position for vertical takeoff of said aircraft, an inlet in said unit having wedge portions and a wedge-shaped mouth, and means for varying the effective shape and orientation of said inlet comprising at least two deflectable auxiliary flaps on the walls of said mouth, tabs on the leading edges of said walls, said tabs being mounted for movement relative to said flaps, a further deflectable auxiliary flap on a forward central portion of said unit, and a slot-forming tab on said further flap.

15. In a vertical takeoff aircraft, a jet propulsion unit mounted on said aircraft, said mounting means including means for tilting the position of said unit relative to said aircraft, an air intake in said unit, a flap tiltably mounted in a central portion of said intake, said flap terminating in an extensible tab adapted to selectively form a slot between said tab and said flap, and means for simultaneously tilting said flap and extending said slot-forming tab with variations in the tilt position of said unit relative to said aircraft.

16. In an aircraft of the type employing a jet propulsion unit adapted to be variably tilted between cruise and takeoff positions, said unit having an air intake, the improvement which comprises means for changing the effective shape and orientation of said air intake with changes in the position of said unit relative to said aircraft, said last named means including at least one flap tiltably mounted adjacent a portion of said intake and terminating in an extensible slot-forming tab.

17. The structure of claim 16 wherein said flap is mounted adjacent a central portion of said intake, and at least one further tiltable flap disposed adjacent a side wall of said intake for tiltable movement with tilting in the position of said first mentioned flap.

18. The combination of claim 17 wherein said further flap in the side wall of said intake terminates in a tab tiltable relative to the remainder of said further flap.

19. The combination of claim 16 wherein said flap is disposed adjacent a central portion of said intake, and at least two further flaps mounted in spaced relation to one another in the side walls of said intake for tiltable movement with tilting of said first mentioned flap.

20. The combination of claim 19 wherein each of said two further flaps terminates in a tab tiltable with respect to the remainder of its associated flap.

(References on following page)

References Cited by the Examiner

UNITED STATES PATENTS

| | | | |
|---|---|---|---|
| 1,427,012 | 8/22 | Page | 244—42.43 |
| 1,860,827 | 5/32 | Turnbull | 340—282 |
| 2,668,027 | 2/54 | Burnelli | 244—42.1 |
| 2,926,868 | 3/60 | Taylor | 244—12 |
| 2,971,725 | 2/61 | Jakimiuk | 244—12 |
| 2,974,900 | 3/61 | Morris et al. | 244—12 |
| 3,030,051 | 4/62 | Kerry et al. | 244—53.8 |

FOREIGN PATENTS

| | | |
|---|---|---|
| 1,125,773 | 3/62 | Germany. |
| 860,497 | 2/61 | Great Britain. |

FERGUS S. MIDDLETON, *Primary Examiner.*

MILTON BUCHLER, *Examiner.*